United States Patent [19]

Wilder et al.

[11] Patent Number: 5,609,369
[45] Date of Patent: Mar. 11, 1997

[54] CLAMP APPARATUS WITH OPENING FOR A PROBE

[75] Inventors: Anthony J. Wilder, Sussex; Mark C. Hope, Surrey, both of United Kingdom

[73] Assignee: The BOC Group plc, Windlesham, England

[21] Appl. No.: 491,438

[22] Filed: Jun. 16, 1995

[30] Foreign Application Priority Data

Jun. 20, 1994 [GB] United Kingdom ............. 9412319

[51] Int. Cl.⁶ .................... F16L 41/00; F16J 9/00
[52] U.S. Cl. ............... 285/93; 285/410; 24/279; 277/2
[58] Field of Search ............. 285/93, 410, 406, 285/366, 367; 24/279; 277/2

[56] References Cited

U.S. PATENT DOCUMENTS

| | | | |
|---|---|---|---|
| 2,466,294 | 4/1949 | Allen | 285/93 |
| 2,496,154 | 1/1950 | Fermier | 285/93 |
| 2,943,869 | 7/1960 | Nordin | 285/93 |
| 3,022,670 | 2/1962 | Sutliffe, Jr. | 73/368.4 |
| 3,141,685 | 7/1964 | Watts | 285/93 |
| 3,144,035 | 8/1964 | Hablania . | |
| 3,199,348 | 8/1965 | Salera | 73/204 |
| 3,563,571 | 2/1971 | Werra . | |
| 3,873,102 | 3/1975 | Lotze et al. | 277/2 |
| 3,966,240 | 6/1976 | Enomoto . | |
| 4,384,736 | 5/1983 | Hartung | 285/93 |
| 4,457,517 | 7/1984 | Dunegan | 285/93 |
| 4,577,511 | 3/1986 | Wetzel . | |
| 5,022,271 | 6/1991 | Hannon, Jr. . | |
| 5,368,069 | 11/1994 | Felber . | |

FOREIGN PATENT DOCUMENTS

| | | | |
|---|---|---|---|
| 2354777 | 5/1973 | Germany | 285/93 |
| A475499 | 8/1969 | Switzerland . | |
| A2279418 | 4/1995 | United Kingdom . | |

*Primary Examiner*—Eric K. Nicholson
*Attorney, Agent, or Firm*—David M. Rosenblum; Larry R. Cassett

[57] ABSTRACT

A clamp for securing adjacent lengths of pipe. The clamp incorporates a seal designed to incorporate a temperature or pressure probe. The clamp is circular and has upstanding end portions and a threaded rod member passing through apertures in the upstanding end portions to secure flange ends of the adjacent lengths of pipe together. The rod member has an opening through which the temperature or pressure probe passes so that temperature pressure can be measured within the adjacent lengths of pipe. Furthermore, seal components held by a support member can be provided to seal the support member to adjacent lengths of pipe. The temperature or pressure probe passes radially through such support member.

5 Claims, 1 Drawing Sheet

CLAMP APPARATUS WITH OPENING FOR A PROBE

BACKGROUND OF THE INVENTION

This invention relates to clamps for securing together adjacent lengths of pipe and more particularly to clamps for vacuum or high pressure use which are adapted for accommodating temperature or pressure measuring means.

Clamps for securing together adjacent lengths of pipe are widely used in many industries and in the vacuum industry in particular. The lengths of pipe commonly have outwardly flanged ends. Known clamps for such are typically are substantially circular and are shaped such that they envelope the flanges of the adjacent pipe and, during tightening of the clamp by means, for example, of bolt passing through upstanding ends of the clamp, the flanges are urged together to effect good contact therebetween.

Normally a circular seal is present between the flanges and in known types of seal, an 'O' ring is sandwiched radially between a metal supporting member comprising two rings of substantially the same radii as the inner and outer edges of the flange ends but with the 'O' ring protruding axially from the supporting member. In use thereof, the clamp is designed to envelope the flanged ends of two lengths of pipe with the supporting member sandwiched therebetween and urge the end and the member together to effect a tightly sealed joint between the lengths of pipe.

In vacuum and other systems, there is commonly a need to insert temperature or pressure measuring devices in to the vacuum piping. This can be effected by drilling apertures in the wall of the pipes; however, problems can be encountered in ensuring an effective seal about such apertures and, in any event, the apertured pipe may not be suitable for re-use in a subsequent system.

The present invention is concerned with the provision of an improved way of introducing temperature and/or pressure measuring probes in a pipe system which ensures that the piping itself is not damaged.

SUMMARY OF THE INVENTION

In accordance with the invention, there is provided a clamp for securing together adjacent lengths of pipe wherein the clamp incorporates means for accommodating temperature or pressure measuring means.

The clamp is preferably designed to secure the length of pipe by means of urged together flanged ends of each length of pipe.

Generally the clamp will incorporate means to position a seal between the adjacent lengths of pipe. Preferably the seal is held adjacent or within a support member prior to its being positioned between the adjacent lengths of pipe.

However, the position of such a seal (with or without a seal supporting member) positioned radially centrally within the clamp can pose difficulties in effecting the introduction of means for accommodating the temperature or pressure measuring means.

In accordance with preferred embodiments of the invention, there is provided a clamp in which the seal comprises two separate seal components held adjacent or within a support member.

In such embodiments, a temperature or pressure measuring probe can then pass radially through the support member, ie between the separate seal components.

The support member is preferably ring shaped with an outer diameter substantially the same as the maximum diameter of the pipe flanges and with a groove on each axially directed face for accommodating the two seal components; the seal components are preferably 'O' rings present in the respective grooves.

The clamp advantageously possesses screw means to urge the flanged ends together within the clamp. Any seal means present will necessarily be accommodated between the flanged ends.

The screw means preferably comprises a rod member passing through apertures in upstanding end portions of the clamp and being positioned substantially tangentially to the lengths of pipe. For ease of fitment in the clamp and ease of assembly of the clamp, the rod member has a hooked or "L" shaped end which can engage in particular with one of the upstanding end portions of the clamp.

In preferred embodiments, the rod member is apertured so as to accommodate the temperature or pressure measuring means.

BRIEF DESCRIPTION

For a better understanding of the invention, reference will now be made, by way of exemplification only, to the accompanying drawings in which.

DETAILED DESCRIPTION OF THE DRAWINGS

With reference to the drawings, there is shown a clamp arrangement of the invention comprising a main clamp component 1 and a seal support member 2.

Figure 2:
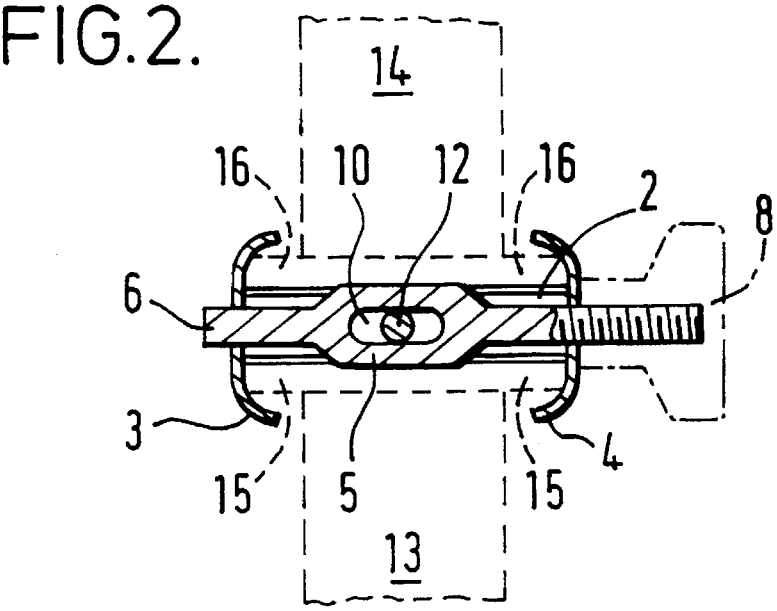
FIG. 2 is a sectional view through the line II—II shown in FIG. 1.

The main clamp component 1 is substantially circular in overall shape and has —see FIG. 2 in particular—a generally three sided cross-section. The component 1 possesses two upstanding end portions 3,4 each having an aperture therein through which is inserted a screw means 5 such that it is positioned substantially tangentially with respect to the clamp (and hence to the pipe to which the clamp is to be attached).

Figure 1:
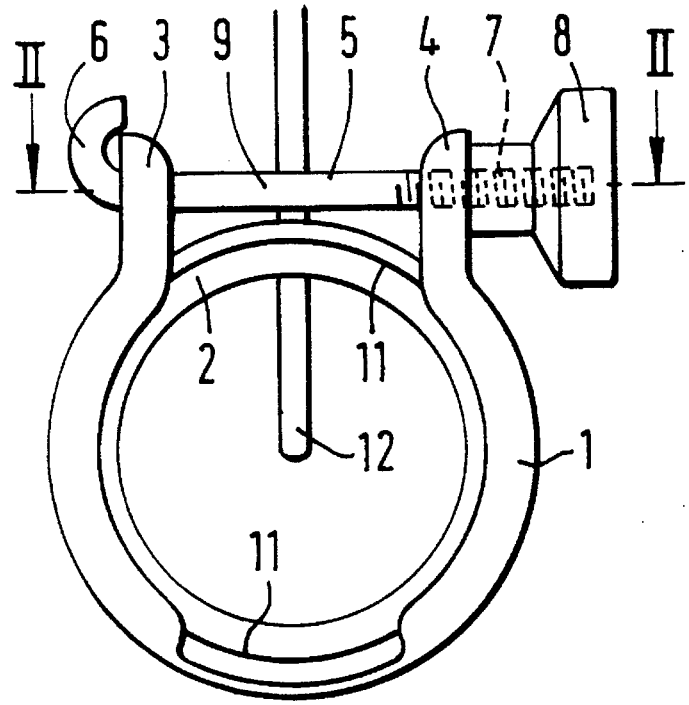
FIG. 1 is a side view of a clamp of the invention.

The screw means 5 has a hooked head 6 at one end and a threaded portion 7 at the other end. A wing nut 8 having an internal bore with a thread corresponding to that of the portion 7 can be screwed on to the portion 7 after the screw means has been inserted in the apertures in the upstanding end portions 3, 4 as shown in FIG. 1. The screw means 5 is therefore adapted to urge the end portions 3, 4 together by means of a tightening of the wing nut 8.

A central portion 9 of the screw means 5 is enlarged in the direction shown in FIG. 2 and has an elongate aperture 10 therein.

The seal support member 2 comprises a circular metallic ring having an external diameter substantially the same as the maximum diameter of the flange of the pipe sections to be clamped together.

The seal support member 2 possesses a groove on each axially orientate face in to which are press fitted an 'O' ring seal 11, one of which is shown in FIG. 1.

The seal support member 2 also possesses a circular aperture through which sealingly is fixed a probe 12 of a thermocouple probe for measuring temperatures within the clamp. The probe 12 also passes through the aperture 10 in the screw means 5 which aperture is made elongate to allow for some latitude in the positioning of the probe 12 therein.

In use of the clamp to secure together two sections 13, 14 of pipe of a vacuum system having flanges 15, 16 respectively as shown by dotted lines in FIG. 2, the seal support member 2 is sandwiched between the flanges 15, 16 and enveloped by the main clamp component 1. The screw means 5 is inserted in the apertures in the upstanding end portions 3, 4, firstly by introducing the hooked head 6 into the aperture in the portion 3 and then by sliding the screw means into the aperture in the portion 4. The clamp component 1 is thereafter tightened by turning the wing nut 8, whereupon the flanges are urged together against the seals 11 of the support member 2. The seal Component 11 appearing on the side of support member 2 obverse to that seen in FIG. 2 is identical to that shown in FIG. 2. The clamping is aided by the cross sectional shape of the main clamp component 1.

During the tightening process, the thermocouple probe 12 remains positioned in the seal member 2 and is finally positioned in the clamped pipe system.

A general benefit of the invention is that pressure and/or temperature probes can be inserted in to, and removed from, pipe systems where and when appropriate without damaging the pipe lengths themselves.

A particular benefit of the invention is that clamps of the invention can be directly interchanged with standard flange seals/clamps commonly used in the vacuum and other industries without any need to change the dimensions or spacings of the flanges of the pipes being connected.

The clamps of the invention are suitable for use in vacuum systems or in systems operating at normal or high pressures.

We claim:

1. A clamp comprising:

means for securing together adjacent lengths of pipe having flanged ends;

said securing means having upstanding end portions and screw means for urging the flanged ends together, said screw means having a rod member passing through apertures in said upstanding end portions and positioned substantially tangentially to the lengths of pipe, said rod member having an opening; and an elongated probe projecting through said opening of said rod member and extending between said adjacent lengths of pipe for measuring one of temperature and pressure within said adjacent length of pipe.

2. The clamp according to claim 1 further comprising means to position a seal between the adjacent lengths of pipe.

3. The clamp according to claim 2 in which the seal comprises two separate seal components held by a support member to seal said support member to said adjacent lengths of pipe.

4. The clamp according to claim 3 in which said probe passes radially through the support member.

5. The clamp according to claim 1 in which the lengths of pipe are for vacuum use.

* * * * *